United States Patent
Qi et al.

(10) Patent No.: US 9,340,457 B2
(45) Date of Patent: May 17, 2016

(54) FUSER COATING COMPOSITION AND METHOD OF MANUFACTURE

(71) Applicant: Xerox Corporation, Norwalk, CT (US)

(72) Inventors: Yu Qi, Oakville (CA); Nan-Xing Hu, Oakville (CA); David C. Irving, Avon, NY (US); Patrick J. Finn, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 481 days.

(21) Appl. No.: 13/664,066

(22) Filed: Oct. 30, 2012

(65) Prior Publication Data

US 2013/0059085 A1    Mar. 7, 2013

Related U.S. Application Data

(62) Division of application No. 12/639,265, filed on Dec. 16, 2009, now abandoned.

(51) Int. Cl.
| | |
|---|---|
| *B05D 3/02* | (2006.01) |
| *C04B 26/08* | (2006.01) |
| *C08G 65/00* | (2006.01) |
| *C09D 5/02* | (2006.01) |
| *C09D 7/12* | (2006.01) |
| *C09D 127/18* | (2006.01) |
| *C09D 171/00* | (2006.01) |
| *G03G 15/20* | (2006.01) |
| *C04B 111/00* | (2006.01) |

(Continued)

(52) U.S. Cl.
CPC .............. *C04B 26/08* (2013.01); *C08G 65/007* (2013.01); *C09D 5/024* (2013.01); *C09D 7/1291* (2013.01); *C09D 127/18* (2013.01); *C09D 171/00* (2013.01); *G03G 15/2057* (2013.01); *C04B 2111/00482* (2013.01); *C08G 2650/48* (2013.01); *C08K 3/04* (2013.01); *C08L 27/18* (2013.01); *Y10T 428/3154* (2015.04)

(58) Field of Classification Search
CPC .......... B05D 3/02; B05D 3/0209; B05D 5/12; B82Y 30/00; C04B 26/08; C04B 2111/00482; Y10T 428/3154; C08G 65/007; C08G 2650/48; C08K 3/04; C08L 27/18; C09D 5/024; C09D 7/1291; C09D 127/18; C09D 171/00; G03G 15/2057
USPC ....................................................... 427/385.5
See application file for complete search history.

(56) References Cited

U.S. PATENT DOCUMENTS

| | | |
|---|---|---|
| 5,501,881 A | 3/1996 | Fuller et al. |
| 5,512,409 A | 4/1996 | Henry et al. |

(Continued)

FOREIGN PATENT DOCUMENTS

WO    2004097853 A1    11/2004

OTHER PUBLICATIONS

U.S. Appl. No. 12/639,265, filed Dec. 16, 2009, Office Action dated Jul. 16, 2012.

(Continued)

*Primary Examiner* — Robert S Walters, Jr.
(74) *Attorney, Agent, or Firm* — Hoffman Warnick LLC

(57) ABSTRACT

The present teachings include a coating composition which includes a liquid, fluoropolymer particles, carbon nanotubes, and a dispersant. The dispersant has a thermal degradation temperature below the melting temperature of the fluoropolymer particles.

15 Claims, 3 Drawing Sheets

(51) Int. Cl.
*C08K 3/04* (2006.01)
*C08L 27/18* (2006.01)

(56) References Cited

U.S. PATENT DOCUMENTS

| | | | |
|---|---|---|---|
| 5,729,813 | A | 3/1998 | Eddy et al. |
| 7,068,898 | B2 | 6/2006 | Buretea et al. |
| 7,608,325 | B2 * | 10/2009 | Rasch et al. .................. 428/323 |
| 2005/0186378 | A1 | 8/2005 | Bhatt |
| 2006/0292360 | A1 | 12/2006 | Hays et al. |
| 2010/0055589 | A1 * | 3/2010 | Qi et al. .......................... 430/71 |
| 2010/0183864 | A1 * | 7/2010 | Qi et al. ..................... 428/319.1 |

OTHER PUBLICATIONS

U.S. Appl. No. 12/639,265, filed Dec. 16, 2009, Office Action dated Jan. 6, 2012.
Khanna, Y.P., "The melting temperature of polytetrafluoroethylene", Journal of Materials Science Letters 7, 817-818, 1988.
Sciencelab, MSDS for Acrylic Acid, http://www.sciencelan.com/msds.php?msdsId=9922794, pp. 1-6.
NanoIntegris, "HipCo Product Sheet", http://www.nanointegris.com/en/hipco, pp. 1-2.

* cited by examiner

FUSER COATING COMPOSITION AND METHOD OF MANUFACTURE

CROSS REFERENCE TO RELATED APPLICATIONS

This application is a divisional of U.S. patent application Ser. No. 12/639,265, filed on Dec. 16, 2009, and incorporated by reference herein.

BACKGROUND

1. Field of Use

This disclosure is generally directed to fuser members useful in electrophotographic imaging apparatuses, including digital, image on image, and the like. This disclosure also relates to processes for making and using fuser members.

2. Background

In a typical electrophotographic imaging apparatus, an image of an original to be copied, or the electronic document image, is recorded in the form of an electrostatic latent image upon a photosensitive member and the latent image is subsequently rendered visible by the application of thermoplastic resin particles or composites thereof which are commonly referred to as toner. The visible toner image is in a loose powdered form and can be easily disturbed or destroyed. The toner image is usually fixed or fused upon a substrate or support member support which may be a cut sheet or continuous media, such as plain paper.

The use of thermal energy for fixing toner images onto a support member is well known. In order to fuse toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Several approaches to thermal fusing of toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time is provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member take place during normal operations. Toner particles that offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation to the hot offset temperature is a measure of the release property of the fuser member, and accordingly it is desirable to provide a fusing surface, which has a low surface energy to provide the necessary release.

A fuser or image fixing member, which can be a rolls or a belt, may be prepared by applying one or more layers to a suitable substrate. Cylindrical fuser and fixer rolls, for example, may be prepared by applying an elastomer or fluoroelastomer to an aluminum cylinder. The coated roll is heated to cure the elastomer. Such processing is disclosed, for example, in U.S. Pat. Nos. 5,501,881; 5,512,409; and 5,729,813; the disclosure of each of which is incorporated by reference herein in their entirety.

Fuser members may be composed of a resilent silicone layer with a fluoropolymer topcoat as the release layer. Fluoropolymers can withstand high temperature (>200° C.) and pressure conditions and exhibit chemical stability and low surface energy, i.e. release properties. For instance, fluoroplastics, such as TEFLON® from E.I. DuPont de Nemours, Inc. have a lower surface energy due to high fluorine content and are widely used for oil-less fusing.

Fluoroplastics, such as PTFE and PFA, can be applied by coating technique onto a fuser member substrate to form a release layer. Since fluoroplastics typically require high baking temperatures (i.e. over 300° C.) to form a continuous film, which is well above the decomposition temperature of silicone rubber (about 250° C.), the processing window for forming a fluoroplastic topcoat over a silicone-containing substrate to achieve uniform coatings without defects is extremely narrow. Cracks and bubbles are the two major defects observed during the fabrication of such fuser members.

SUMMARY

According to various embodiments, the present teachings include a coating composition which includes a liquid, fluoropolymer particles, carbon nanotubes, and a dispersant. The dispersant has a thermal degradation temperature below the melting temperature of the fluoropolymer particles.

An alternate embodiment includes a method of making a fuser member. The method includes obtaining a fuser member, including a silicone resilient layer disposed on a substrate. The method includes providing a coating dispersion, which includes a liquid, fluoropolymer particles, carbon nanotubes, and a dispersant. The dispersant has a thermal degradation temperature below the melting temperature of the fluoropolymer particles. The coating dispersion is applied over the silicone resilient layer to form a coating layer. The coating layer is heated to a temperature above the degradation temperature of the dispersant to allow removing the dispersant to form a fuser member.

A further aspect described herein is a fuser member that includes a substrate, a silicone layer disposed on the substrate, and an outer layer disposed on the silicone layer. The outer layer is formed from a coating dispersion comprised of a liquid, fluoropolymer particles, carbon nanotubes, and a thermally removable dispersant, wherein the thermally removable dispersant has a thermal degradation temperature below the melting temperature of the fluoropolymer particles.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the drawings have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
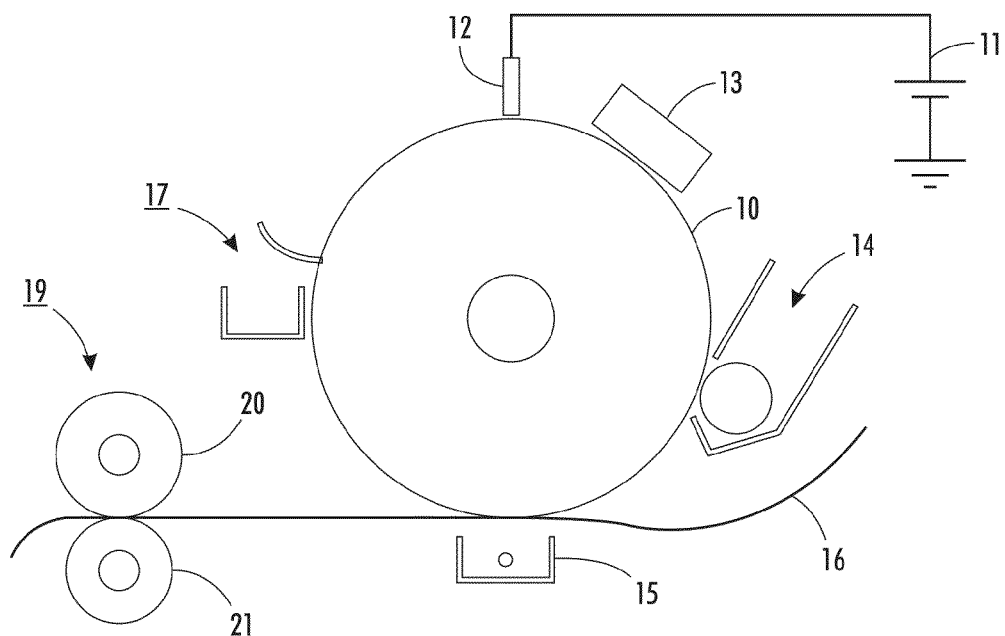
FIG. 1 is a schematic illustration of an image apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, a photoreceptor 10 is charged on its surface by means of a charger 12 to which a voltage has been supplied from a power supply 11. The photoreceptor 10 is then imagewise exposed to light from an optical system or an image input apparatus 13, such as a laser and light emitting diode, to form an electrostatic latent image thereon. Generally, the electrostatic latent image is developed by bringing a developer mixture from a developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image, forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface in image configuration, they are transferred to a copy sheet 16 by a transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to a fusing station 19, depicted in FIG. 1 as a fuser roll 20 and a pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
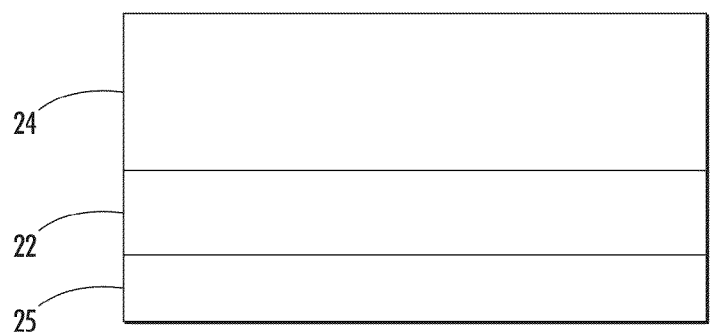
FIG. 2 is a schematic of an embodiment of a fuser member.

FIG. 2 is an enlarged schematic view of an embodiment of a fuser member, demonstrating the various possible layers. As shown in FIG. 2, a substrate 25 has an intermediate layer 22 thereon. Intermediate layer 22 can be, for example, a silicone rubber. On intermediate layer 22 is an outer layer 24, for example, a fluoroplastic.

Figure 3:
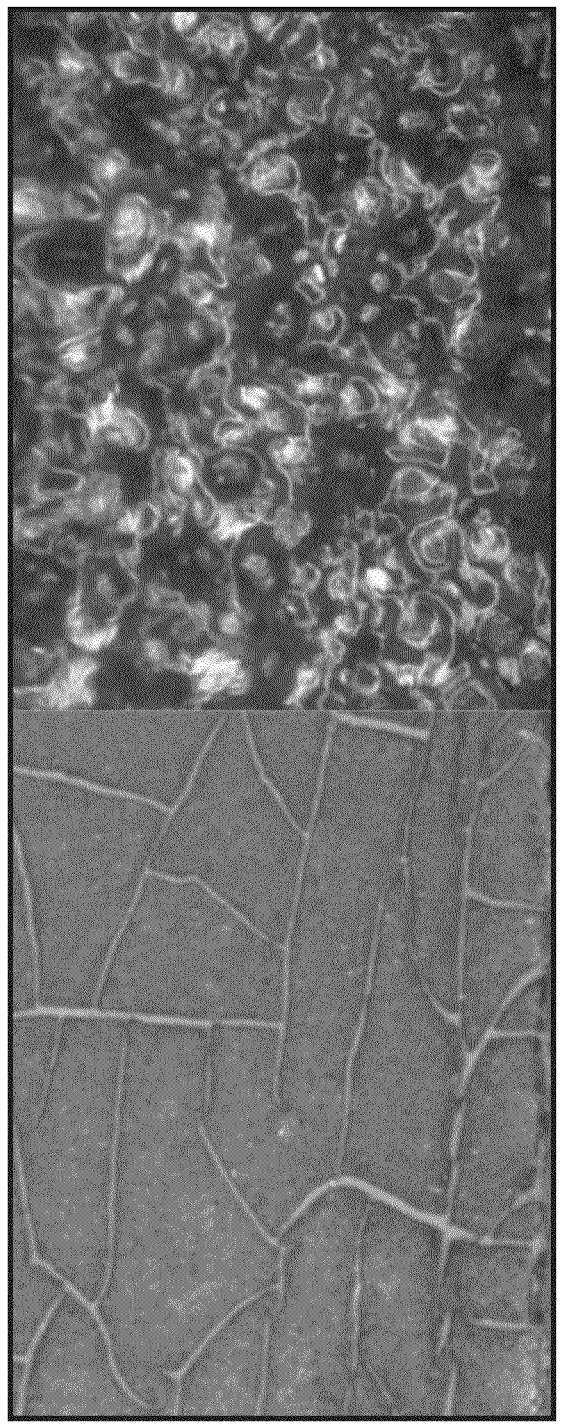
FIG. 3 is a photographic of a fluoroplastic topcoat containing cracks and bubbles.

Fluoroplastics have been used as the topcoat materials for oil-less fusing for their good releasing property. PFA and PTFE, the most representative fluoroplastics for fusing applications, are chemically and thermally stable and possess a low surface energy. However, these materials are also highly crystalline and therefore difficult to process. High temperature sintering (>350° C.) is the only way to make them into a continuous film. The silicone rubber layer starts to degrade around 250° C. It is theorized that while melting the topcoats at temperatures greater than 300° C., the silicone rubber releases gas or small molecules. This creates cracks or bubbles in the topcoat layer as shown in FIG. 3. The cracks and bubbles formed in the fluoroplastic surface layer coatings are caused by the silicone rubber degradation while baking the fluoroplastic surface layer at high temperatures. The required baking temperature for PFA is over 320° C., which is well above the decomposition temperature of silicone rubber (about 250° C.). When the decomposed materials release during the formation of the fluoroplastic surface layer, cracks or bubbles are formed. The current fluoroplastic coating formulations provide an extremely narrow processing window to achieve a defect-free fluoroplastic topcoat. The manufacturing yield of the fluoroplastic fuser topcoats is very low.

An exemplary embodiment of a topcoat formulation that prevents cracks and bubbles from forming includes a liquid, fluoropolymer particles, carbon nanotubes (CNT) and a stabilizer or dispersant that decomposes at a temperature below the melting temperature of fluoropolymer particles. The selected decomposition temperature range of the stabilizer is from about 100° C. to about 280° C. In other embodiments, the decomposition temperature range is from about 150° C. to about 260° C. or from about 200° C. to about 260° C., or from about 230° C. to about 250° C. The combination of the CNT and the thermally removable stabilizer in the formulation are believed to help minimize cracks and bubbles in the topcoat layer. Additionally, the stabilizer is removed by the thermal processing without negatively affecting the silicone rubber layer and the PFA topcoat. The topcoat or release layer has an electrical surface resistivity of less than about $10^8$ Ω/sq.

The thickness of the outer fluoroplastic surface layer of the fuser member herein is from about 10 to about 250 micrometers, or from about 15 to about 100 micrometers.

The silicone layer can include silicone rubbers such as room temperature vulcanization (RTV) silicone rubbers, high temperature vulcanization (HTV) silicone rubbers, low temperature vulcanization (LTV) silicone rubbers and liquid silicone rubbers (LSR). These rubbers are known and readily available commercially, such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182.

The thickness of the silicone layer is from about 0.2 to about 20 mm, or from about 0.25 to about 7 mm.

Fluoropolymer particles suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer particles provide chemical and thermal stability and have a low surface energy. The fluoropolymer particles have a melting temperature of from about 255° C. to about 360° C. or from about 280° C. to about 330° C.

The liquid used as the media for the formulation can include water, an alcohol, a $C_5$-$C_{18}$ aliphatic hydrocarbon such as pentane, hexane, heptane, nonane, dodecane and the like, a $C_6$-$C_{18}$ aromatic hydrocarbon such as toluene, o-xylene, m-xylene, p-xylene, and the like, an ether, an ester, a ketone, and an amide. The liquid provides a media for dispersion of fluoropolymer particles and the fillers.

As used herein and unless otherwise specified, the term "carbon nanotube" or CNT refers to an elongated carbon material that has at least one minor dimension; for example, width or diameter of up to 100 nanometers. In various embodiments, the CNT can have an average diameter ranging from about 1 nm to about 100 nm, or in some cases, from about 10 nm to about 50 nm, or from about 10 nm to about 30 nm. The carbon nanotubes have an aspect ratio of at least 10, or from about 10 to about 1000, or from about 10 to about 100. The aspect ratio is defined as the length to diameter ratio.

In various embodiments, the carbon nanotubes can include, but are not limited to, carbon nanoshafts, carbon nanopillars, carbon nanowires, carbon nanorods, and carbon nanoneedles and their various functionalized and derivatized fibril forms, which include carbon nanofibers with exemplary forms of thread, yarn, fabrics, etc. In one embodiment, the CNTs can be considered as one atom thick layers of graphite, called graphene sheets, rolled up into nanometer-sized cylinders, tubes, or other shapes.

In various embodiments, the carbon nanotubes or CNTs can include modified carbon nanotubes from all possible carbon nanotubes described above and their combinations. The modification of the carbon nanotubes can include a physical and/or a chemical modification.

In various embodiments, the carbon nanotubes or CNTs can include single wall carbon nanotubes (SWCNTs), multi-wall carbon nanotubes (MWCNTs), and their various functionalized and derivatized fibril forms such as carbon nanofibers, as exemplarily shown in FIG. 1.

The CNTs can be formed of conductive or semi-conductive materials. In some embodiments, the CNTs can be obtained in low and/or high purity dried paper forms or can be purchased in various solutions. In other embodiments, the CNTs can be available in the as-processed unpurified condition, where a purification process can be subsequently carried out.

The carbon nanotubes are present in an amount of from about 0.1 to about 50 or from about 2 to about 20, or from about 5 to about 10 weight percent based on the total weight of the carbon nanotube and fluoropolymer particles in the formulation.

The dispersant can include a polymeric amine, a polyethylene glycol, a polymeric acid, and a natural gum material. More specifically the dispersant can be a polyacrylic acid, a polymethacrylic acid, a polyethylene glycol containing surfactant, and a polyallylamine. The dispersant is present in an amount ranging from about 1 weight percent to about 50 weight percent or from about 5 to about 30, or from about 10 to about 20, based on the total weight of the carbon nanotubes and the dispersant in the formulation.

The Young's Modulus of the outer layer is from about 50 kpsi to about 100 kpsi, or from about 70 kpsi to about 95 kpsi, or from about 85 kpsi to about 95 kpsi. The tensile stress in the outer layer is from about 1000 psi to about 5000 psi, or from about 2000 psi to about 4000 psi, or from about 2700 psi to about 3300 psi.

In various embodiments, the coating composition can be coated using, for example, coating techniques, extrusion techniques and/or molding techniques. As used herein, the term "coating technique" refers to a technique or a process for applying, forming, or depositing a dispersion to a material or a surface. Therefore, the term "coating" or "coating technique" is not particularly limited in the present teachings, and dip coating, painting, brush coating, roller coating, pad application, spray coating, spin coating, casting, or flow coating can be employed.

EXAMPLES

Example 1

General Procedure for Preparation of CNT/PFA Topcoats on Silicone Rubber Rolls

CNT Aqueous Dispersion:

A surfactant solution is prepared by dissolving about 0.05 part of polyacrylic acid in about 4.95 part of deionized water. About 0.1 part of CNT is then added into the surfactant solution, and the solution is then sonicated with a high power sonicator for about 1 minute at 60% output. The sonication is repeated 3 times. The resulting CNT aqueous dispersion is observed to be uniformly coated on a piece of glass slide.

CNT/PFA Coating Formulation:

About 17.5 part of CNT dispersion described above is further mixed with a PFA dispersion (22.5 part) having a weight of about 38 weight percent, thereby resulting in about 2 weight percent of CNT in PFA. The CNT/PFA dispersion is stable at room temperature over a number of days. Prior to coating, the CNT/PFA dispersion is sonicated for about 1 minute, and uniformly coated on the glass slide.

Coating and Baking:

the CNT/PFA coating dispersion is coated on a pre-cleaned and primed silicone rubber roll by spray-coating to form a layer having approximate thickness of 30 to 40 micrometers. The primer is applied by spray-coating with a clear primer coating formulation purchased from DuPont (990CL). The coating layer is then heated at 200° C. for 5 minutes and 345° C. for 18 minutes. The dried coatings are uniform and free of cracks, as analyzed by optical microscopic image and SEM image.

Comparative Example

The PFA coating formulation is coated on the pre-cleaned silicone rubber roll by spray-coating to form an approximate thickness of 30 micrometer layer. The coating layer is then heated with the same conditions, however the resulting coating have many cracks.

Figure 4A:
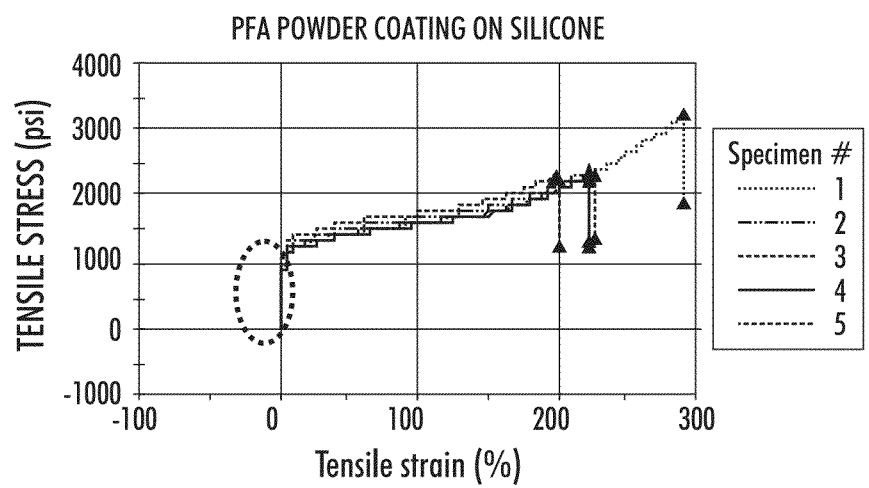
FIG. 4 shows tensile strain versus tensile stress for fluoroplastic topcoat (a) without carbon nanotubes and (b) with carbon nanotubes.
Figure 4B:
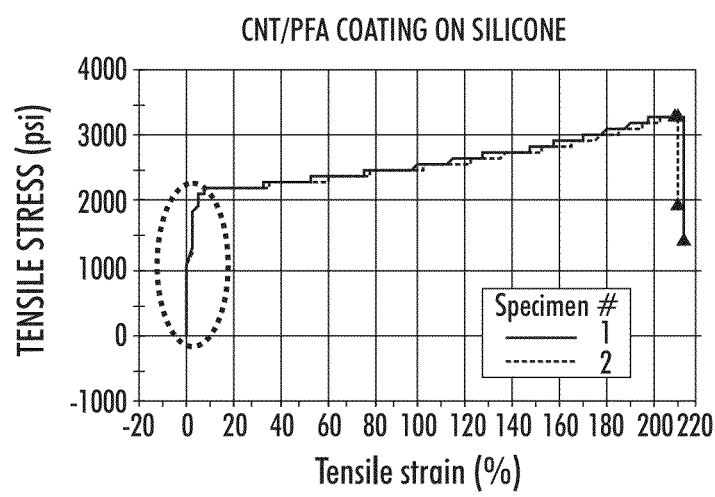

Compared to the current fluoroplastic coating materials and processes, the formulation described herein allows a wider processing window (ranging from about 330° C. to about 360° C. and from about 5 to about 15 minutes to produce crack-free topcoats. Defect-free topcoats have been fabricated with a thickness ranges from 30 to 50 micron and show significantly improved mechanical properties (2× yield strength and higher Young's Modulus) (FIG. 4(b)) compared to the topcoat without CNT (FIG. 4(a)).

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of making a fuser member, comprising:
    obtaining a fuser member comprising a silicone resilient layer disposed on a substrate;
    providing a coating dispersion comprising a liquid, fluoropolymer particles, carbon nanotubes, and a dispersant, wherein the dispersant has a thermal degradation temperature below a melting temperature of the fluoropolymer particles;
    applying the coating dispersion over the silicone resilient layer to form a coating layer;
    heating the coating layer to a temperature above the degradation temperature of the dispersant and below a melting temperature of the fluoropolymer particles for a time sufficient to remove the dispersant, wherein the degradation temperature ranges from about 150° C. to about 250° C.; and
    heating the coating layer to a temperature above the melting temperature of the fluoropolymer particles after the dispersant is removed to melt the fluoropolymer particles wherein the melting temperature for the fluoropolymer particles ranges from about 255° C. to about 360° C.

2. The method of claim 1, wherein the liquid is selected from a group consisting of water, an alcohol, a $C_5$-$C_{18}$ aliphatic hydrocarbon, a $C_6$-$C_{18}$ aromatic hydrocarbon, an ether, an ester, a ketone, and an amide.

3. The method of claim 1, wherein the fluoropolymer particles are selected from the group consisting of polytetrafluoroethylene; perfluoroalkoxy polymer resin; copolymer of tetrafluoroethylene and hexafluoropropylene; copolymers of hexafluoropropylene and vinylidene fluoride; terpolymers of tetrafluoroethylene, vinylidene fluoride, and hexafluoropropylene; and tetrapolymers comprising tetrafluoroethylene, vinylidene fluoride, and hexafluoropropylene monomers.

4. The method of claim 1, wherein the carbon nanotubes are selected from the group consisting of single wall carbon nanotubes and multiple wall carbon nanotubes, and wherein the carbon nanotubes have an aspect ratio of at least about 10.

5. The method of claim 1, wherein the dispersant is selected from a group consisting of a polyacrylic acid, a polymethacrylic acid, a polyethylene glycol containing surfactant, and a polyallylamine.

6. The method of claim 1, wherein the coating layer has an electrical surface resistivity of less than about $10^8$ Ω/sq.

7. The method of claim 1, wherein the step of applying the dispersion over the resilient layer to form a coating layer comprises an application technique selected from the group consisting of spray coating, painting, dip coating, brush coating, roller coating, spin coating, casting, and flow coating.

8. A method of making a surface layer, comprising:
    a silicone resilient layer;
    providing a coating dispersion comprising a liquid, fluoropolymer particles, carbon nanotubes, and a dispersant, wherein the dispersant has a thermal degradation temperature below a melting temperature of the fluoropolymer particles;
    applying the coating dispersion over the silicone resilient layer to form a surface layer; and
    heating the surface layer to a temperature above the degradation temperature of the dispersant and below a melting temperature of the fluoropolymer particles for a time sufficient to remove the dispersant, wherein the degradation temperature ranges from about 230° C. to about 250° C.; and
    heating the surface layer to a temperature above the melting temperature of the fluoropolymer particles after the dispersant is removed to melt the fluoropolymer particles wherein the melting temperature for the fluoropolymer particles ranges from about 285° C. to about 330° C.

9. The method of claim 8, wherein the liquid is selected from a group consisting of water, an alcohol, a $C_5$-$C_{18}$ aliphatic hydrocarbon, a $C_6$-$C_{18}$ aromatic hydrocarbon, an ether, an ester, a ketone, and an amide.

10. The method of claim 8, wherein the fluoropolymer particles are selected from the group consisting of polytetrafluoroethylene; perfluoroalkoxy polymer resin; copolymer of tetrafluoroethylene and hexafluoropropylene; copolymers of hexafluoropropylene and vinylidene fluoride; terpolymers of tetrafluoroethylene, vinylidene fluoride, and hexafluoropropylene; and tetrapolymers comprising tetrafluoroethylene, vinylidene fluoride, and hexafluoropropylene monomers.

11. The method of claim 8, wherein the carbon nanotubes are selected from the group consisting of single wall carbon nanotubes and multiple wall carbon nanotubes, and wherein the carbon nanotubes have an aspect ratio of at least about 10.

12. The method of claim 8, wherein the dispersant is selected from a group consisting of a polyacrylic acid, a polymethacrylic acid, a polyethylene glycol containing surfactant, and a polyallylamine.

13. The method of claim 8, wherein the surface layer has an electrical surface resistivity of less than about $10^8$ Ω/sq.

14. The method of claim 8, wherein the step of applying the dispersion over the silicone layer to form a surface layer comprises an application technique selected from the group consisting of spray coating, painting, dip coating, brush coating, roller coating, spin coating, casting, and flow coating.

15. A method of making a fuser member, comprising:
    providing a fuser member comprising a silicone resilient layer disposed on a substrate;
    providing a coating dispersion comprising a liquid, fluoropolymer particles, carbon nanotubes, and a dispersant, wherein the dispersant has a thermal degradation temperature below a melting temperature of the fluoropolymer particles;

applying the coating dispersion over the silicone resilient layer to form a coating layer; and heating the coating layer to a temperature above the degradation temperature of the dispersant and below a melting temperature of the fluoropolymer particles for a time sufficient to remove the dispersant, wherein the degradation temperature ranges from about 150° C. to about 250° C.; and heating the coating layer to a temperature above the melting temperature of the fluoropolymer particles after the dispersant is removed to melt the fluoropolymer wherein the melting temperature for the fluoropolymer particles ranges from about 255° C. to about 360° C., wherein the coating layer has an electrical surface resistivity of less than about $10^8$ Ω/sq.

* * * * *